Figure 3:
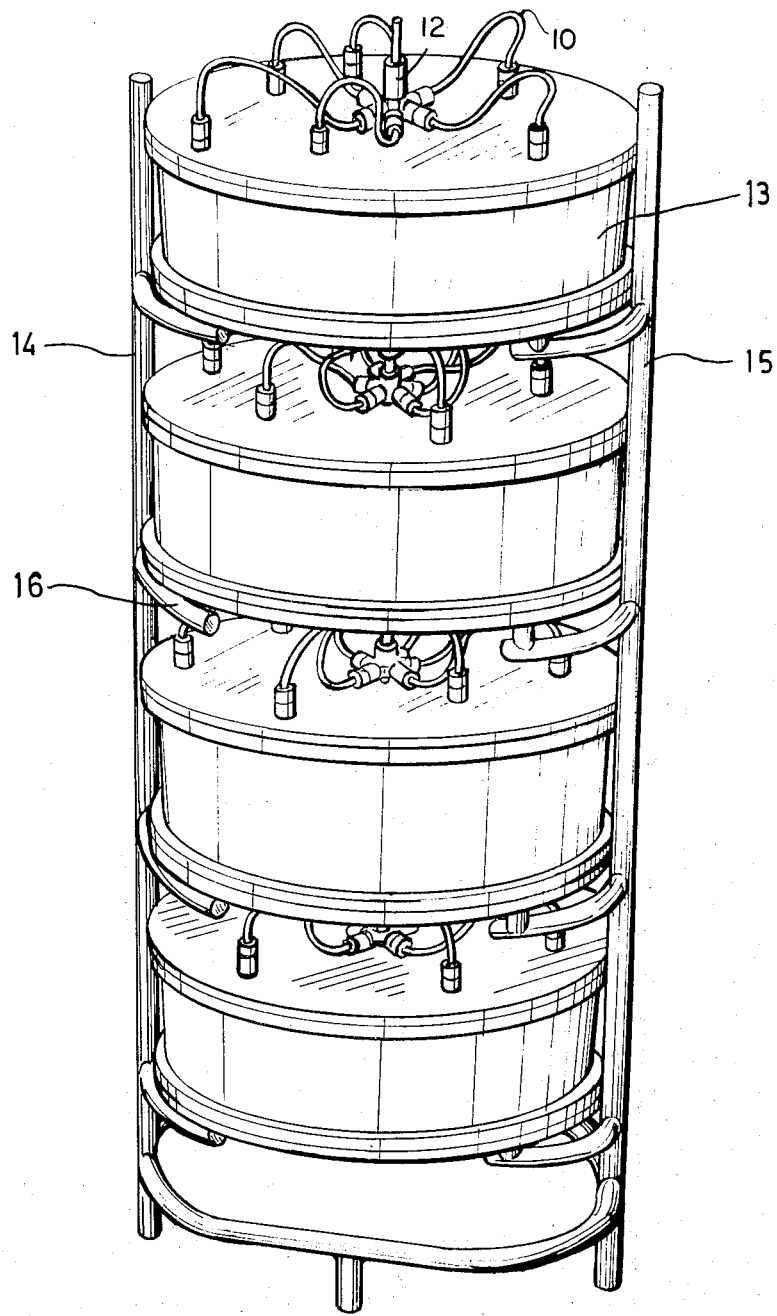

United States Patent [19]
Ek et al.

[11] 3,780,866
[45] Dec. 25, 1973

[54] METHOD FOR THE SEPARATION OF SUBSTANCE MIXTURES BY CHROMATOGRAPHY AND A COLUMN MEANS ADAPTED TO BE USED FOR THE METHOD

[75] Inventors: Leif V. Ek, Jarfalla; Per L. Wallin, Uppsala; Thure P. M. Tibbling, Bjarred, all of Sweden

[73] Assignee: Pharmacia Fine Chemicals AB, Uppsala, Sweden

[22] Filed: Nov. 16, 1971

[21] Appl. No.: 199,158

[30] Foreign Application Priority Data
Nov. 20, 1970  Sweden............................ 15713/70

[52] U.S. Cl. .............................. 210/198 C, 55/386
[51] Int. Cl. .......................................... B01d 15/08
[58] Field of Search .................... 210/31 C, 198 C; 55/386

[56] References Cited
UNITED STATES PATENTS
3,539,505  11/1970  Lauer et al...................... 210/198 C
3,360,904  1/1968  Peakins, Jr. et al. ............. 55/386 X
3,446,057  5/1969  Bakalvar et al................. 210/198 C
3,422,605  1/1969  Crowler................................ 55/386
3,453,811  7/1969  Crowler................................ 55/386

*Primary Examiner*—John Adee
*Attorney*—Fred C. Philpitt

[57] ABSTRACT

The present invention is concerned with a method for the separation of substance mixtures by chromatography. More particularly, the invention pertains to an improvement in a method for the separation of substance mixtures by chromatography while using a separating medium bed, a solution of the mixture to be separated being charged into the bed and an eluting agent being supplied to the bed in order to force liquid therethrough to recover at least two fractions of the substance mixture and the bed being maintained divided into at least two separate portions.

1 Claim, 3 Drawing Figures

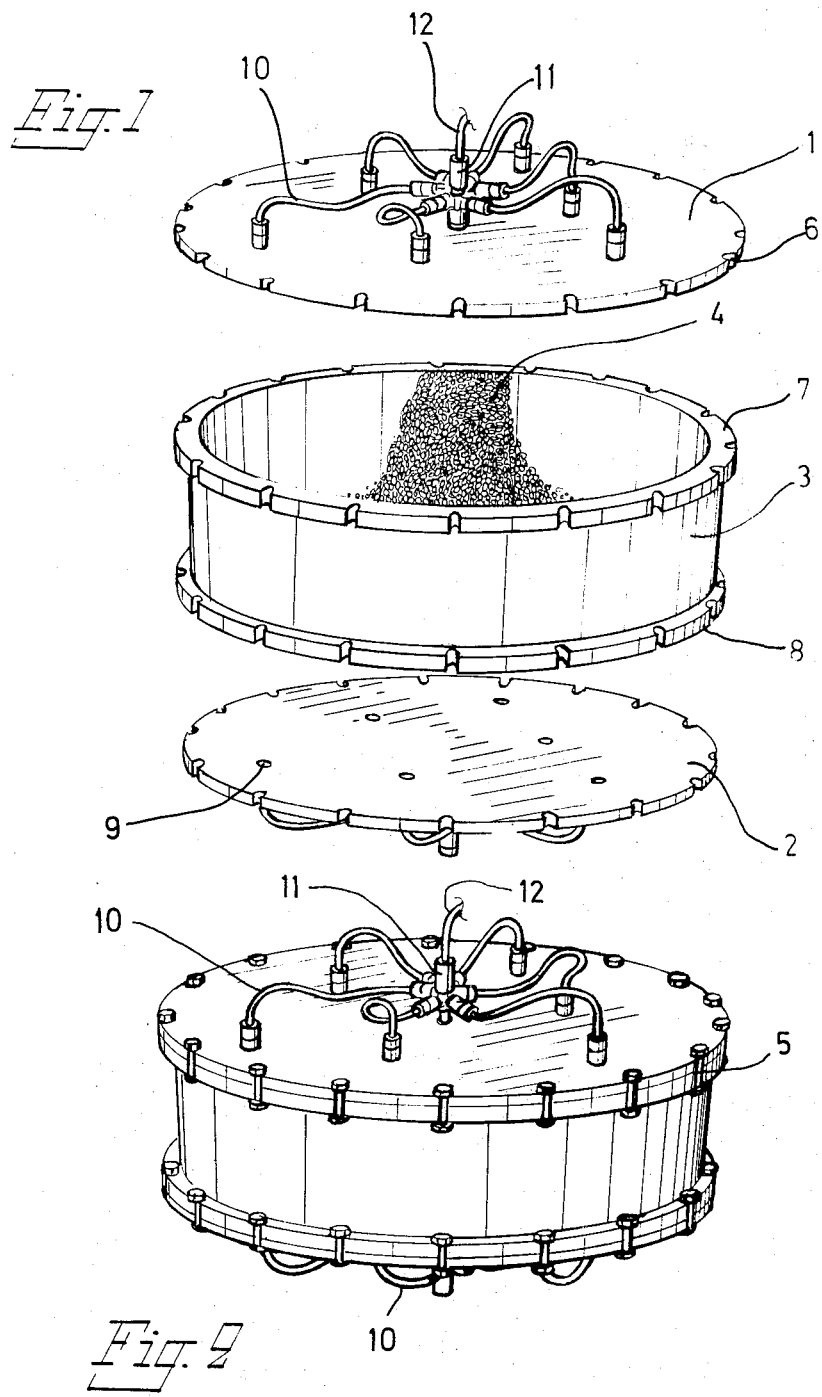

METHOD FOR THE SEPARATION OF SUBSTANCE MIXTURES BY CHROMATOGRAPHY AND A COLUMN MEANS ADAPTED TO BE USED FOR THE METHOD

The improvement of the invention comprises collecting the moving liquid between the portions of the bed into a narrow stream to mix all parts of the liquid leaving the outlet side of one bed portion and then spreading the liquid of the narrow stream over the inlet side of the adjacent bed portion, seen in the movement direction of the liquid.

Preferably, the bed portions are arranged one above the other on different levels. In this context, the bed portions may especially be arranged one vertically above the other.

The invention also encompasses a column means for the separation of substance mixtures by chromatography, comprising at least two bed portions of a separating medium, preferably in grain form, separated from each other, characterized by the feature that each bed portion is accomodated within a column unit comprising a cover element, a bottom element and an intermediate portion, said column units being connected with each other to form the column means, said cover and bottom elements being each a round plate having holes or apertures at different distances from the center of the plate and liquid transport lines being connected to the holes or apertures and to a tubular portion attached to the plate, said tubular portion serving as a collector means when the plate is used as a bottom element and as a spreading means when the plate is used as a cover element, said tubular portion being connected to its equivalent in an adjacent column unit.

According to the invention, the inlet apertures or holes of the cover element in a column unit should preferably be placed in a special manner in order to attain as uniform a distribution of the liquid which is moved from one column unit to the next column unit, seen in the direction of movement of the liquid. If the diameter of the circular cover element is $\phi$ the apertures should be placed on two assumed circles having the diameters, respectively, $\phi_1$ and $\phi_2$, the quotient $\phi_1/\phi$ being in the range of from 0.40 to 0.60, inclusive, and the quotent $\phi_2/\phi$ being in the range of from 0.55 to 0.75, inclusive. What has been said on the cover element also applies to the bottom element.

The number of, respectively, inlet and outlet apertures on each circle may be in the range of from three to 10 inclusive, preferably three to six inclusive.

The invention will now be described in more detail with reference to an embodiment of the same illustrated in the accompanying drawings, in which FIG. 1 illustrates a column unit of a gel filtration column, the unit comprising two unit components according to the invention and a tubular portion, the three elements being shown in an exploded view, FIG. 2 illustrates the same elements when assembled, and FIG. 3 illustrates a number of column units assembled together by means of a frame structure to form a gel filtration column.

With reference to FIG. 1, the reference numeral 1 identifies a plate serving as a cover element for constructing a gel filtration column, and the reference numeral 2 identifies a plate serving as the bottom element of the same unit. Arranged between the two plates is a tubular portion 3. The appearance of the units in the assembled condition of the column is illustrated in FIG. 2. The column unit, which when assembled has a drum-like appearance, is intended to accomodate a gel bed composed of gel grains. The gel bed is supported by a relatively coarse mesh distribution net (not shown), which rests against the side of the bottom element facing the interior of the tubular portion, and a support net of finer mesh (not shown). The gel grains are indicated in FIG. 1 by the reference numeral 4. The three main components of the column unit are secured together in the exemplary embodiment by bolts 5, which are inserted in recesses 6 in the two plates 1 and 2 and in the tubular portion 3, via flanges 7 and 8 located on the ends thereof.

Each bottom or cover element is provided with a number of apertures 9 disposed at different radii from the centre of the plate. Connected to each aperture is a liquid transport line 10, which is arranged to convey liquid between the aperture in the plate and a tube portion 11 common to a number of transport lines. The tube portion 11 is intended to be connected with its equivalent in a plate located immediately above or immediately beneath the same by means of an additional liquid transport line 12. This latter line may be provided with a valve.

FIG. 3 illustrates a gel filtration column constructed of column units. For supporting each column unit, of which the uppermost is identified by the reference numeral 13, there is used a frame structure having side pieces 14 and 15 which carry support arms 16 arranged one above the other.

A separation operation by means of gel filtration is effected in two steps, namely the charging step and the elution step. In the charging step, a solution of the substances to be separated from each other is charged to the top column unit. The solution is passed through the tube portion 12 and dispersed via the transport line 10 to different zones of the upper portion of a gel layer located in the column unit 13, the gel layer comprising swollen gel grains of such mesh that substances having relatively large molecular size are unable to penetrate into the interior of the grains, while substances of relatively small molecular size are able to do so. During the subsequent elution step, the eluent is passed through the tube portion 12 and substances in the output mixture migrate downwardly in the column at different speeds. depending on their molecular sizes, while substances of larger molecular size migrate more quickly and substances of smaller molecular size move more slowly. During the elution step it is possible to remove fractions of different substances present in the output mixture from the lower portion of the column or from any suitable column unit.

The column units according to the invention afford the advantage whereby they enable columns to be assembled which suit different separation processes. For a simple separation process, e.g., the desalting of a protein solution, it is sufficient to assemble together just a few column units, while a more complicated separation process, e.g., the separation of a protein mixture, may require a large number of column units. Despite the fact that the liquid is first collected together during the elution step to a common stream beneath each column unit, and, subsequent to passing through a small transport distance, is re-dispersed over a relatively wide surface in a gel bed, no impairment of the separation result has been observed. The substances can be removed from the lower portion of the column in fractions which are equally well separated as though a column corresponding to combined gel beds of the column units had been used.

The concept of the invention is extremely suitable for use when desiring to separate substances of exceedingly large molecular size, e.g., viruses, from low molecular substances. For this purpose there are required grains having a high exclusion limit. It is impossible to produce gel grains which are capable of resisting compression in a column without adopting particular and technically complicated measures. If the gel grains are compressed to an excessive extent, the flow of the solution through the column will be too poor for a technical process to be carried out successfully. The concept of the present invention enables a relatively high gel filtration bed of gel grains which, as a result of the elasticity required by the high exclusion limit, are liable to inhibit the flow of solution therethrough, into a number of beds of such low height that the elasticity of the grains presents no serious disadvantage from the point of view of flow of the solution therethrough. The separation result, however, is not jeopardized by the collection of the solution and the dispersion thereof as a result of the interconnection of the column units, it being important that such connections are effected as simply as possible.

What we claim is:

1. Fluid chromatography apparatus comprising
   a. a plurality of separate chromatograph column sections in serial communication with each other so that fluid is able to pass serially therethrough,
   b. each column section comprising:
      1. a cover element,
      2. a bottom element,
      3. an intermediate side wall portion adapted to extend between said cover element and said bottom element,
      said cover element and said bottom element
         A. each being round in configuration,
         B. each having a plurality of openings disposed outwardly from the center thereof,
   c. a separate set of conduits associated with each cover element and each bottom element, one end of each conduit in each set being connected to one of said plurality of openings, and
   d. the other end of each conduit in a given set being connected to a common tubular passageway, each common tubular passageway that is connected to a set of conduits that is connected to a bottom element serving as a collector means, and each common tubular passageway that is connected to a set of conduits that is connected to a cover element serving as a spreading means.

* * * * *